Oct. 2, 1962 — G. C. THRIFT — 3,056,592
CONTACT APPARATUS
Filed March 16, 1959 — 3 Sheets-Sheet 1
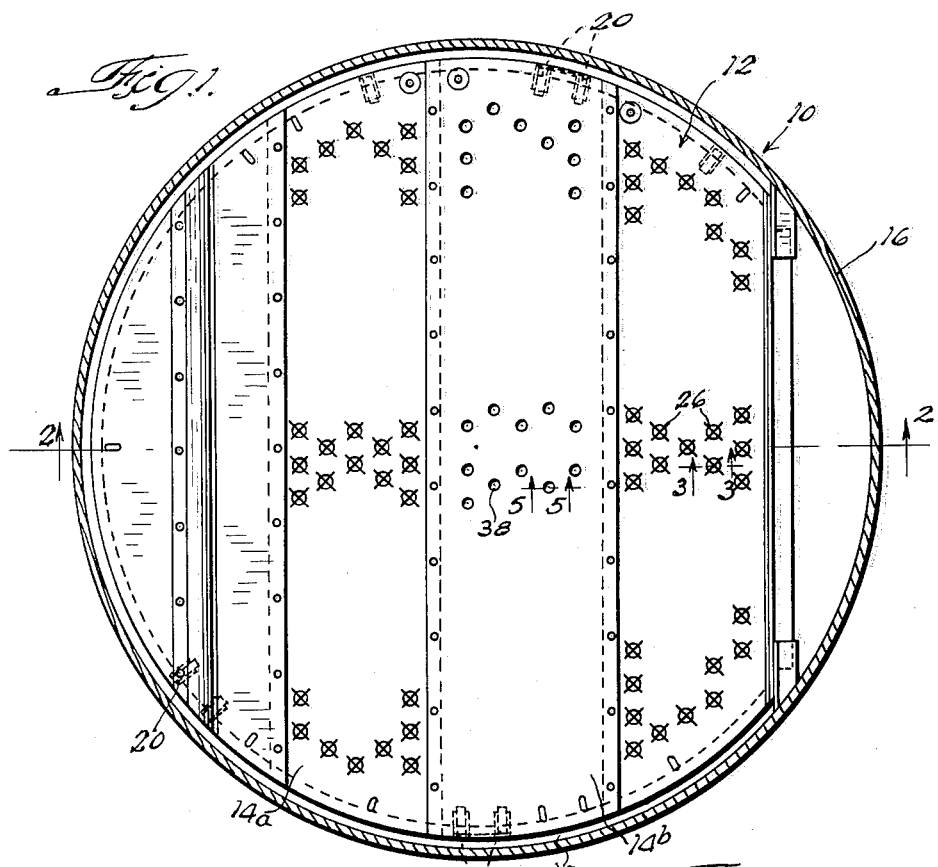
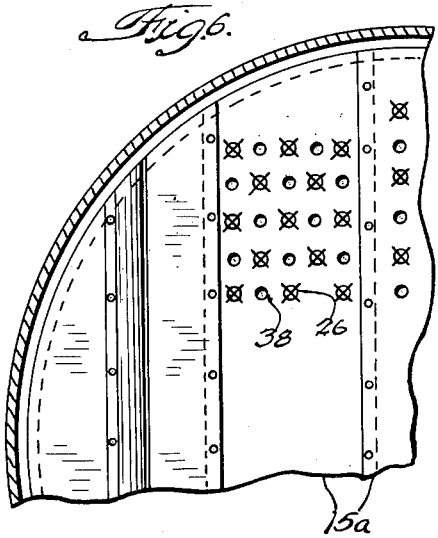
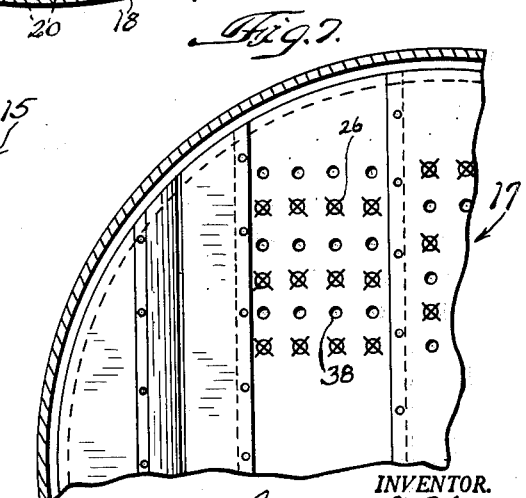
INVENTOR.
Griffin C. Thrift Oct. 2, 1962 G. C. THRIFT 3,056,592
CONTACT APPARATUS
Filed March 16, 1959 3 Sheets-Sheet 2
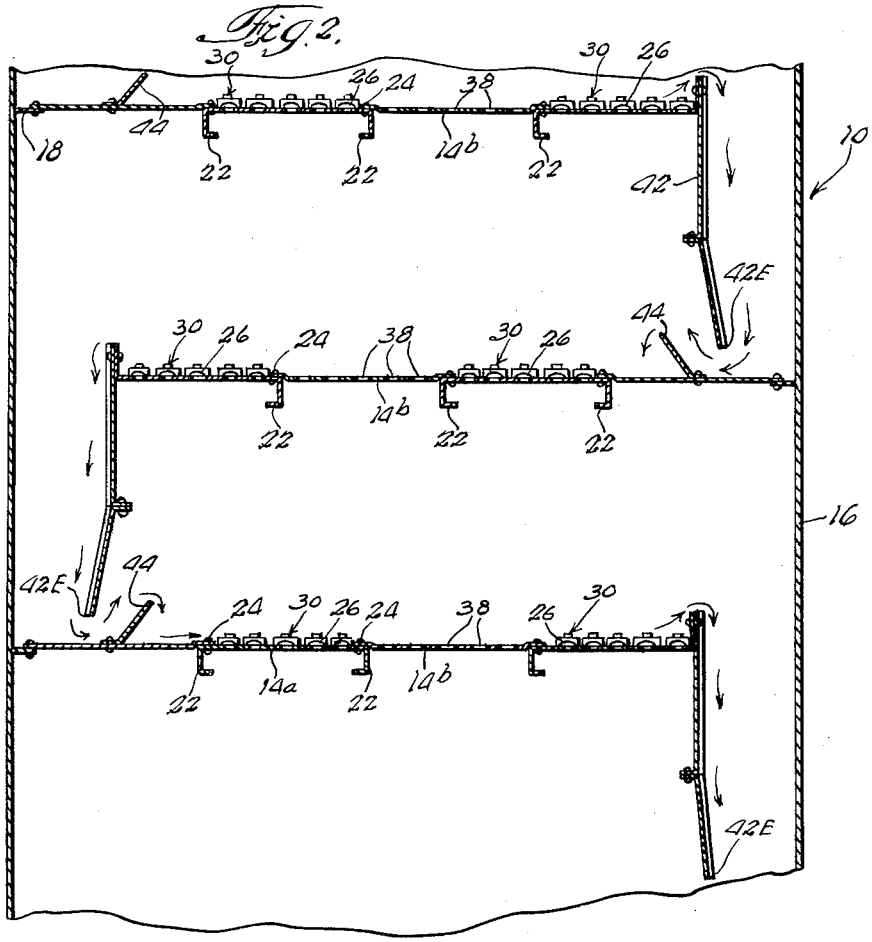
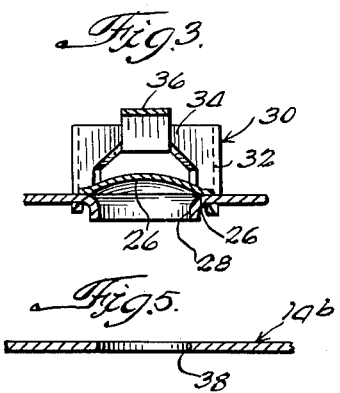
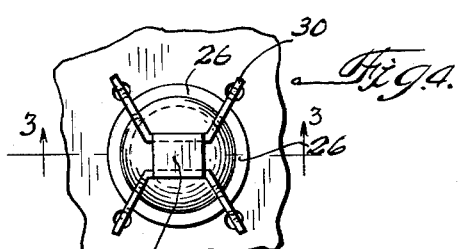
INVENTOR.
Griffin C. Thrift
BY
Olson, Mecklenburger, van Holst,
Pendleton & Neuman
ATTYS.

Oct. 2, 1962  G. C. THRIFT  3,056,592
CONTACT APPARATUS
Filed March 16, 1959  3 Sheets-Sheet 3
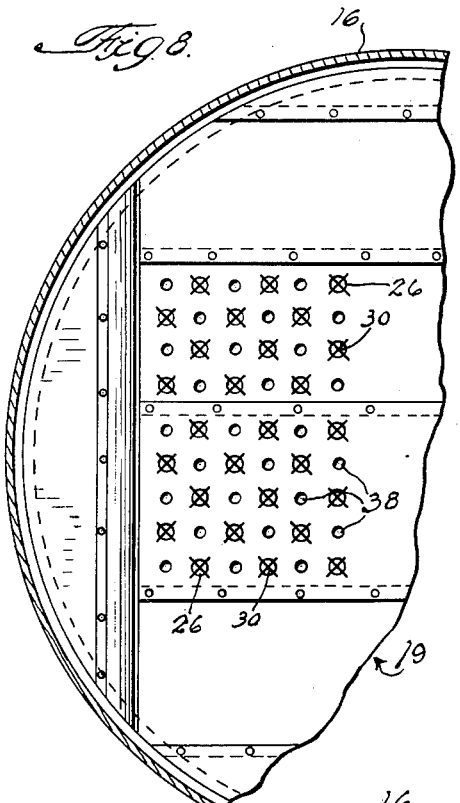
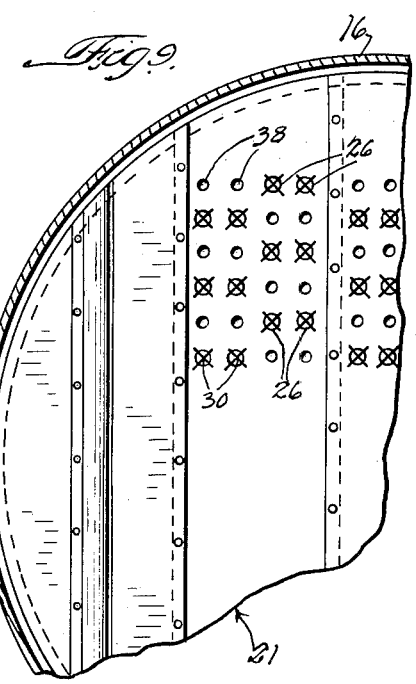
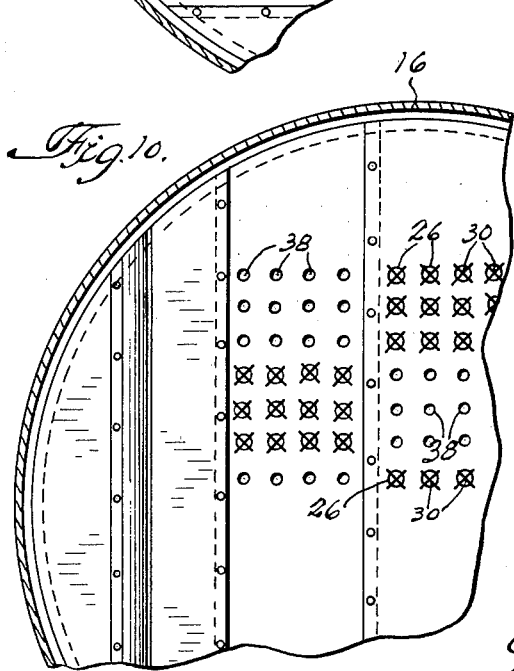
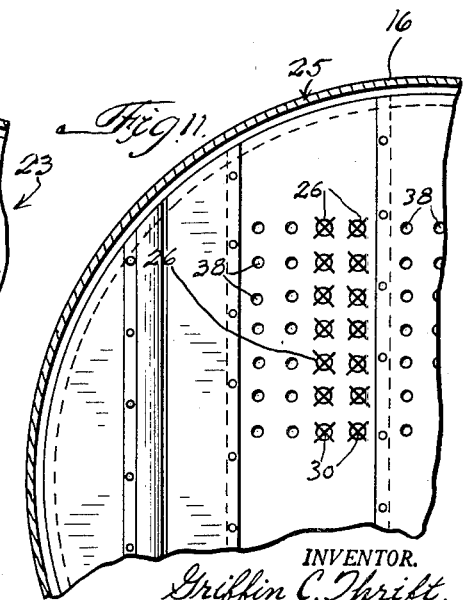
INVENTOR.
Griffin C. Thrift 3,056,592
CONTACT APPARATUS
Griffin C. Thrift, Wichita, Kans., assignor to Koch Engineering Company, Inc., Wichita, Kans., a corporation of Kansas
Filed Mar. 16, 1959, Ser. No. 799,644
2 Claims. (Cl. 261—114)

This invention relates to an improved fluid contact apparatus and more particularly pertains to a contact apparatus employing plates or decks having both unobstructed apertures and valved openings therein, and is a continuation-in-part of my copending application Serial No. 538,665, filed on October 5, 1955, now Patent No. 2,903,251.

The apparatus hereinafter described is particularly well adapted for the fractionation of organic liquids such as hydrocarbons, alcohols, and the like, and is equally well suited for the washing of gases or in fact any operation in which effective contact between gases or vapors and liquids, or between liquids and liquids, is to be effected.

In contact apparatus employing decks having valved openings a certain minimum fluid pressure must be present in the apparatus before valves will rise from their seats. Similarly in sieve trays employing apertured decks having no valves, dumping will occur until a certain minimum rising fluid pressure is present in the apparatus.

It is an object of this invention to provide a contact apparatus employing plates with unobstructed apertures and valved openings effecting efficiency of operation over a wide range of apparatus conditions.

It is another object of this invention to provide contact apparatus employing valved and unvalved plate openings in which the ratio of the total areas of such openings is within a range of ratios assuring continuous efficiency of operation.

It is a further object of this invention to provide contact apparatus, efficiently operable over wide ranges of vapor or gas loads, employing a downcomer and weir arrangement assuring desired contact between countercurrently flowing phases in the apparatus.

It is a still further object of this invention to provide contact apparatus which is less expensive to fabricate while also providing operating efficiency superior to that of other contact apparatus known in the art.

The above and other objects of this invention will become more apparent from the following detailed description when read in the light of the accompanying drawings and appended claims.

In one embodiment of this invention a contact apparatus is provided comprising a cylindrical shell in which a plurality of apertured plates are arranged in superposed relationship. Each plate has a downcomer; the downcomers are staggeredly arranged on consecutive plates so that the fluid flow direction will reverse on successive plates. Some of the plate apertures have reciprocally movable check valves disposed thereon; others are uncovered. If approximately 15 to 60 percent (and preferably 30 to 50 percent) of the rising vapor passes through the unvalved openings when the valves of the valved openings are fully open, efficient apparatus operation over a large range of operating conditions is achieved. The provided apparatus also employs a downcomer-weir arrangement assuring efficient countercurrent engagement between the light and heavy phases in the apparatus as will hereinafter be explained in greater detail.

For a more complete understanding of this invention reference will now be made to the drawing wherein:

FIGURE 1 is a sectional view of a contact apparatus formed in accordance with this invention, illustrating one plate member thereof in plan view;

FIG. 2 is a fragmentary sectional view taken on line 2—2 of FIG. 1;

FIG. 3 is a transverse sectional view of a valve member employed in the illustrated apparatus taken on line 3—3 of FIG. 1;

FIG. 4 is a plan view of the valve member illustrated in FIG. 3;

FIG. 5 is a sectional view of a plate or deck portion defining an unvalved aperture taken on line 5—5 of FIG. 1; and FIGS. 6 through 11 are fragmentary sectional views partly in elevation illustrating various geometric patterns which the valves and unobstructed plate apertures may assume for purposes of this invention.

Referring now more particularly to FIG. 1, a sectional view of a contact apparatus 10 is illustrated showing a plate or deck 12 in plan view. Each plate comprises a plurality of elongate sections 14a and 14b supported by an encompassing apparatus shell 16; means such as the annular rings or ledges 18 may be employed in conjunction with clamp members 20 (illustrated in FIG. 1) for purposes of supporting the plate sections. Sections 14a and 14b are presented for illustrative purposes only as other plate sections will work to advantage.

As will be more clearly seen from FIG. 2, plate sections 14a may be employed having the opposed channel-like depending leg members 22 together with plate sections 14b which overlap end portions of the sections 14a and are secured thereto by means of the nut-and-bolt assemblies 24 or other equivalent means. The depending leg portions 22 of the plate sections 14a dispense with the need for supporting beams commonly found in apparatus of the type illustrated. Sections 14a are obviously resistant to warping and bending and reinforce the entire plate construction against twisting or buckling.

From the various views of the drawing it will be seen that each plate has a plurality of apertures passing through the thickness thereof through which a rising fluid medium may pass and countercurrently engage a downwardly moving heavier fluid medium. Some of the openings are valved, having reciprocally movable check-valves disposed thereon, while other of the plate openings are uncovered.

The valve members employed in the illustrated apparatus comprise concavo-convex disc members 26 (more clearly seen in FIGS. 3 and 4) which are mounted over plate apertures 28. A retaining spider-like member 30 having four depending leg members 32 and four arm portions 34 meeting at a channel-like portion 36 limits the upward movement of each disc 26 from the underlying plate surface. The illustrated valves are the same as those disclosed in the Huggins and Thrift Patent No. 2,819,050 which issued January 7, 1958.

As previously mentioned, each plate of the contact apparatus formed in accordance with the invention also has unvalved apertures such as apertures 38; a section of an aperture-defining portion of a plate is illustrated in FIG. 5.

In accordance with this invention it has been found that desired flexibility of apparatus operation is obtained if each plate of the contact apparatus contains both valved openings and uncovered apertures. At low rates of vapor or gas flow the rising light fluid phase will pass through the plate apertures 38 and the heavier fluid phase will descend through the same apertures. As the rates of flow increase, the pressure exerted by the rising fluid phase will be such as to lift valve members 26 from their seats so that a portion of the rising fluid phase passes through the valved deck openings and another portion of the rising fluid phase passes through the deck apertures 38.

As the flow rate of the rising fluid phase increases more and more of the valve members will rise from their seats, allowing passage through the plate openings therebeneath. It has been found that efficiency of operation is assured over an extremely broad range of operating conditions if from 15 to 60 percent of the rising fluid phase passes through the unvalved plate apertures when all of the plate valves are in the fully open position.

It will be noted from FIGS. 6 through 11 that the valves and plate apertures are preferably arranged in definite geometric patterns so that the rising fluid phase may uniformly pass through portions of the entire plate member and accordingly passage will not concentrate at any one particular area of a plate. Varying the weight of the covers per unit area of deck opening covered so that the covers will uniformly rise over the entire deck surface will also assist in assuring uniformity of passage of vapor through a deck. It will be noted from plate fragment 15 in FIG. 6 that valved and unvalved openings are alternately arranged over the surfaces of the plate sections 15a which combine to form the entire plate member.

In FIG. 7 it is seen from the plate fragment 17 that valved and unvalved openings may be arranged in rows which are parallel to the direction of fluid flow across each deck or plate.

In FIG. 8 it will be noted from plate fragment 19 that the valved and unvalved plate openings are alternately arranged along diagonal axes over the entire surface area thereof.

In FIG. 9 a valved opening-aperture pattern is illustrated in plate fragment 21 wherein two valved openings alternate with two unvalved openings in a direction running parallel to the direction of fluid flow across the deck, and a single valved opening alternates with a single unvalved opening in a direction running transverse to the fluid flow across the deck.

FIG. 10 illustrates a plate fragment 23 having an arrangement wherein the valved and unvalved openings are alternately arranged in blocks on each deck section.

FIG. 11 shows a deck or plate construction fragment 25 from which it is apparent that the size of the valved and unvalved openings need not be identical. The only limiting feature in the provided construction constitutes the relative total unvalved deck area relative to the total unvalved deck aperture area. The size of the individual valved openings or plate unvalved apertures is not of primary importance.

While the total unvalved aperture area of each contact apparatus plate should be sufficient to enable approximately 15 to 60 percent of the rising fluid phase to pass therethrough when all valves are in the fully open position, it is preferable that the percentage be within the range of 30 to 50 percent.

The valve-retaining means 30 for the valves 26 employed may so limit the removal of the valves from the plate surface that the peripheral area between the valve and plate through which the rising fluid phase may rise is less than the area of the plate opening 28. If this condition obtains it is this peripheral or cylindrical area which is to be construed as the valved opening in designing the plate so that the proper percentage of rising fluid phase may pass through the unvalved apertures.

As will be seen from the various views of the drawing and more particularly from FIG. 2, each apparatus plate has a downcomer 42 defining one lateral end portion thereof. The downcomers are staggeredly arranged on successive plates so that the descending heavier fluid phase must move in opposite directions on successive plates as illustrated by the arrows in FIG. 2.

From FIG. 2 it will also be noted that the terminal portion of each downcomer is spaced adjacent a weir 44 secured to the underlying plate. It will further be seen that the interval between the terminal end limit 42e of each downcomer and the underlying plate surface is less than the height of each weir 44. As a result, sufficient heavier fluid phase may accumulate in that portion of each plate defined by the weir 44 and the adjacent apparatus shell wall so as to retain terminal end limit 42e of the downcomer 42 submerged therein. The weir 44 thus functions to form a seal pan with a shell portion of the apparatus.

Since there is a fluid seal at the point where the heavier fluid phase is deposited on an underlying plate member by the downcomer, it is impossible for a rising gaseous fluid phase to channel directly to an overlying plate through the downcomer opening. Also, the weir 44 prevents a downflowing heavier fluid phase from passing directly into an adjacent unobstructed aperture 38 or valve opening 28. The use of the weir 44 in conjunction with the downcomer 42 in the manner just described is therefore seen to improve the overall efficiency of the illustrated apparatus.

The valved and unvalved plate opening percentages herein set forth are based on a normal or right angle passage of the rising fluid phase through each plate member.

From the foregoing description it is believed apparent that the contact apparatus construction of this invention is made possible by utilizing equipment already in use in the formation of contact apparatus, and that it requires no radical departure from regular manufacturing methods.

The above-described contact apparatus operates at high efficiency over a broader range of vapor or gas flow than does the conventional contact apparatus employing plate members having valved openings only and also achieves a high operating efficiency at a much lower vapor load than either conventional valved contact apparatus or conventional perforated trays or sieve trays with downcomers.

It is believed that the description of this invention has made clear the flexibility thereof as well as the many modifications and changes that may be made therein.

This invention is to be limited therefore only by the scope of the appended claims.

I claim:

1. In a contact apparatus for separating a light fluid phase from a heavier fluid phase, a plurality of superposed decks, each of said decks having a plurality of apertures and a plurality of openings having valves thereon, each of said apertures and openings being of substantially uniform cross-sectional dimensions, between about fifteen to sixty percent of the light fluid phase passing through the apertures when all of the valves of the valved openings are in the fully open position; each of said openings and each of said apertures being arranged in a checkerboard pattern and in a substantially uniform manner in each of said decks whereby the rising light fluid phase passes uniformly through said deck when all of said valves are in the fully open position; said valves being arranged in a plurality of groups substantially uniformly disposed over said deck area, the valves of each group having a substantially uniform weight per unit area differing from the weights per unit area of the other groups.

2. In an apparatus for separating a rising light fluid phase from a heavier descending fluid phase, a plurality of superposed decks, a downcomer depending from each of said decks whereby the heavier fluid phase may pass from an upper deck to a lower deck, said downcomers being oppositely disposed on consecutive decks whereby the heavy fluid phase moves on consecutive decks in opposite directions, each of said decks having a plurality of apertures and a plurality of openings having valves thereon, each of said apertures and openings being arranged in a checkerboard pattern and of substantially uniform cross-sectional dimensions whereby said light fluid phase may pass through said openings and apertures of each deck at a substantially uniform pressure and engage the descending heavy fluid phase moving over said each deck, between about fifteen to sixty percent of the light fluid phase passing through the apertures when all of the valves of the valved openings are in the fully open position.

(References on following page)

References Cited in the file of this patent

UNITED STATES PATENTS

| | | |
|---|---|---|
| 2,713,478 | Ragatz | July 19, 1955 |
| 2,718,902 | Nutter | Sept. 27, 1955 |
| 2,772,080 | Huggins et al. | Nov. 27, 1956 |

FOREIGN PATENTS

| | | |
|---|---|---|
| 885,548 | France | May 31, 1943 |

OTHER REFERENCES

Chemical Engineering, of May 1954.